United States Patent Office 3,641,038
Patented Feb. 8, 1972

3,641,038
10,11-DIHYDRO - 10,5 - (IMINOMETHANO)-5H-DI-BENZO[a,d]CYCLOHEPTEN - 10,01; ACID ADDITION SALTS THEREOF; AND PROCESS
Martin A. Davis, Montreal, Quebec, and Thomas A. Dobson, Dollard Ormeaux, Quebec, Canada, assignors to Ayerst, McKenna & Harrison Limited, St. Laurent, Montreal, Quebec, Canada
No Drawing. Filed Oct. 29, 1968, Ser. No. 771,602
Int. Cl. C07d 39/00
U.S. Cl. 260—289 R                 3 Claims

ABSTRACT OF THE DISCLOSURE

There is disclosed herein 10,11 - dihydro-10,5-(iminomethano) - 5H-dibenzo[a,d]cyclohepten-10-ol and salts thereof with pharmacologically acceptable acids, a process for preparing said compound, and intermediates used in said process. The compound possesses anti-convulsant activities, and methods for its use are also disclosed.

BACKGROUND OF THE INVENTION

This invention relates to 10,11 - dihydro-10,5-(iminomethano) - 5H-dibenzo[a,d]cyclohepten-10-ol and salts thereof with pharmacologically acceptable acids, to a process for preparing said compound, and to intermediates used in its preparation, some of which have pharmacological properties of their own. 10,11-dihydro-10,5-(iminomethano)-5H-dibenzo[a,d]cyclohepten-10-ol and its salts with pharmacologically acceptable acids are distinguished by a high order of anti-convulsant activity together with a low order of toxicity, thus possessing a highly favourable therapeutic index.

The compound of this invention could be regarded as being somewhat related to other hydroxylated 10,5-iminomethano derivatives in this series. It should be noted, however, that the compound of this invention possesses the unusual carbinolamine structure which distinguishes it from other compounds in this series.

SUMMARY OF THE INVENTION

The compound of this invention may be represented by Formula I

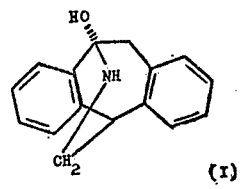

Said compound is basic in nature and forms salts with pharmacologically acceptable acids. Such salts are pharmacologically equivalent to the compound itself.

DETAILED DESCRIPTION OF THE INVENTION

A preferred process for preparing the compound of this invention proceeds according to the following scheme.

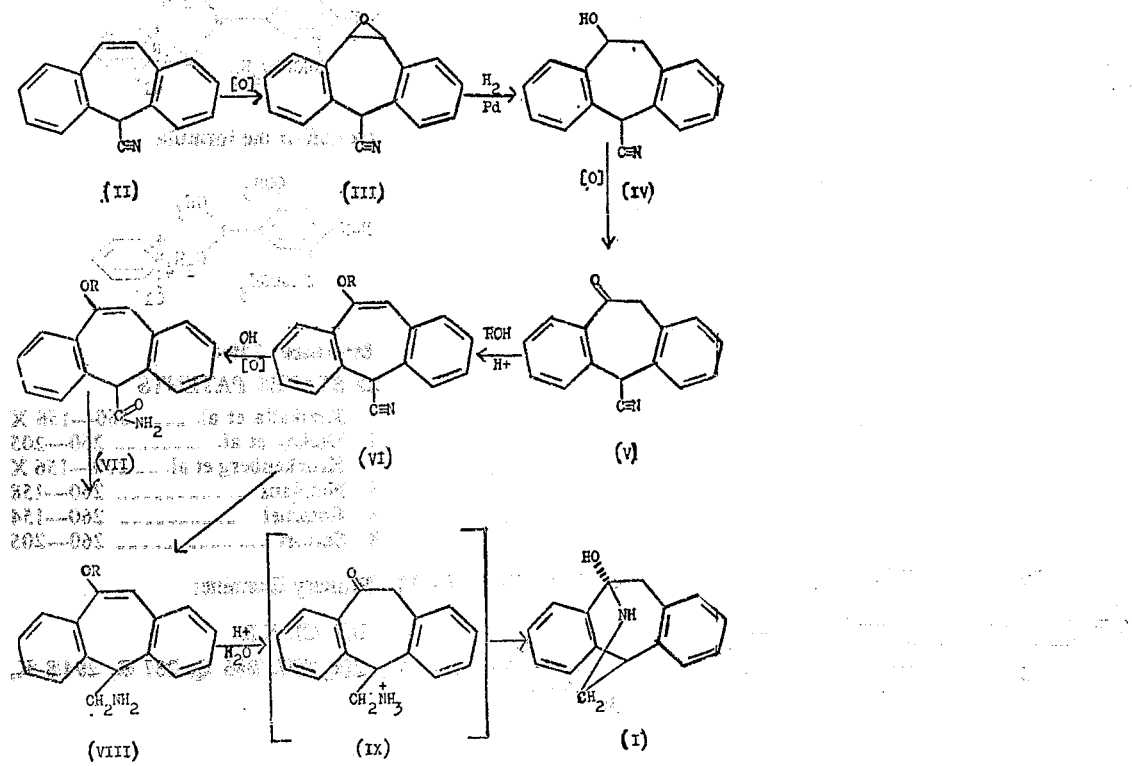

In the above scheme R represents a lower alkyl or hydroxyalkyl group containing from one to five carbon atoms, such as, for example, the methyl group.

Thus, for the synthesis of compound I, 5H-dibenzo[a,d]cycloheptene-5-carbonitrile of Formula II prepared as described by M. A. Davis et al. in J. Med. Chem. I, 88 (1964) is treated with a suitable oxidising agent to form the corresponding 10,11-epoxy compound of Formula III. A preferred oxidant for this reaction is an organic peracid, such as for example, 3-chloroperbenzoic acid. The reaction is carried out in an inert solvent, such as for example, ethyl acetate, for a sufficient period to allow essentially complete epoxidation of the double bond of compound II. 10,11 - dihydro-10,11-epoxy-5H-dibenzo[a,d]cycloheptene-5-carbonitrile of Formula III is isolated by precipitation and filtration and is then catalytically hydrogenated in the presence of a noble metal catalyst, such as for example, palladium-on-charcoal, to form 10,11-dihydro-10-hydroxy - 5H-dibenzo[a,d]cycloheptene-5-carbonitrile of Formula IV. Oxidation of the latter compound then affords the corresponding 10-oxo-5H-dibenzo[a,d]cycloheptene - 5(11H)carbonitrile of Formula V. A preferred oxidant for this reaction is Jones' reagent, i.e. chromic acid solution in acetone. The ketone function in the compound of Formula V is next protected by forming an enol ether for example, 10-methoxy or 10-ethoxy-5H-dibenzo[a,d]cycloheptene-5-carbonitrile of Formula VI, through interaction with a lower alkanol, ROH, in the presence of an acidic condensing agent, preferably hydrogen chloride. The significance of the radical R is as defined above. The enol ethers of Formula VI may also be prepared from the ketone V by interaction with a di-lower alkyl sulfite, prepared in situ from a lower alkanol, ROH, and thionyl chloride at low temperatures.

In the next step of the synthetic route the carbonitrile function of the enol ethers of Formula VI is reduced to an aminomethyl group, thus furnishing the corresponding amines, for example 10-methoxy-5H-dibenzo[a,d]-cycloheptene-5-methylamine of Formula VIII. This reduction is performed under those conditions which do not affect the acid-sensitive enol ether function and the reaction is advantageously carried out by catalytic hydrogenation in the presence of a noble metal catalyst, such as for example, Raney nickel, in methanol which has been saturated with gaseous ammonia. The desired end products of Formula VIII are isolated, preferably in the form of their salts and are purified as salts formed with a suitable mineral acid.

They may also be characterized as their acrylated derivatives, for example as the N-acetyl derivative. Alternatively the amines of Formula VIII may be obtained by treatment of the carbonitrile VI with a boron hydride in an inert solvent. Advantageously this reaction utilizes diborane in tetrahydrofuran solution. In another approach to the desired amines, the carbonitriles of Formula VI are converted to the corresponding carboxamides of Formula VII by hydrolysis. In a preferred process this hydrolysis is effected by the use of hydrogen peroxide and aqueous potassium carbonate mixture, the reaction being carried out in acetone solution at the boiling point of this solvent. The carboxamides thus formed are then converted to the aminomethyl compounds of Formula VIII by treatment with a suitable reducing agent, such as for example lithium aluminum hydride-mercuric chloride mixture.

For the preparation of the desired final product, the aminomethyl compounds of Formula VIII, either in the free base form or as their salts with inorganic acids, are treated with an excess of a mineral acid, such as for example, aqueous hydrochloric acid, and kept at ambient temperature for a period of time in the order of twenty-four hours. This treatment with acid serves to hydrolyze the enol ether function of VIII to the corresponding ketone of Formula IX. Due to the proximity of the two functional groups, this keto amine readily undergoes 10,5-transannular interaction thus forming the desired carbinolamine 10,11 - dihydro-10,5-(iminomethano)-5H-dibenzo-[a,d]cyclohepten-10-ol of Formula I. This is isolated as the free base by neutralization and purified by recrystallization. Optionally the free base may be converted into acid addition salts by treatment with a molar equivalent of a pharmacologically acceptable organic or inorganic acid.

The novel crbinolamine of this invention possesses useful biological properties. In warm-blooded animals it has central nervous system depressant properties and may be used as a central nervous system depressant. Exemplary of such properties are a marked ability to prevent seizures caused by the administration of electroshock or by pentylenetetrazole in procedures similar to those described by Swinyard et al. in J. Pharmacol., vol. 106, p. 319 (1952) or by Beyer in Proc. Soc. Exp. Biol., Med., vol. 78, p. 277 (1951), this effect being elicited after both parenteral and oral application of the test compound. Furthermore the compound is effective in the rotarod and potentiation of ethanol narcosis tests, both tests being recognized as reliable indicators of central nervous system depressant activity. It is a noteworthy feature of the compound that the abovementioned pharmacological properties are elicited at dosages vastly below those causing toxic manifestations; the protective effect against pentylenetetrazole is, for example, elicited at doses which are less than one-three hundredth of the $LD_{50}$. For use as a central nervous system depressant in warm-blooded animals the compound of this invention may be formulated as its free base or as a water-soluble acid addition salt with a pharmacologically acceptable organic or inorganic acid, in the form of tablets or capsules consisting of the active ingredient together with suitable binders, extenders and lubricating agents. Such dosage forms may contain from one to fifty mg. of the active ingredient and may be administered from once to four times daily.

Certain of the novel chemical intermediates used in this invention also possesses valuable biological properties. Thus the carboxamide of Formula VII where R equals $CH_3$ is able to protect against the seizures caused by electroshock or pentylenetetrazole, when tested in the procedures cited above the effects being demonstrated after either oral or parenteral administration of the test compound. Furthermore this anticonvulsant effect is elicited at dosages well below those causing motor deficits and very much below those causing toxic manifestations. The aminomethyl compound of Formula VIII where R equals $CH_3$ likewise shows a protective action against convulsant effects caused by electroshock or pentylenetetrazole and is an anticonvulsant agent. The epoxy carbonitrile of Formula III has antibacterial action against a number of gram positive and gram negative micro-organisms such as, for example, Staphylococcus pyogenes, both penicillin-resistant and penicillin-sensitive strains, Sarcina lutea, Streptococcus fecalis, Escherichia coli, Aerobacter aerogenes, Salmonella pullorum, Pseudomonas aeruginosa, Proteus mirabilis, and Proteus vulgaris and is an antibacterial agent. It also possesses activity against a number of pathogenic fungi such as, for example, Candida albicans, Microsporum gypseum and Trichophyion granulosum and against the parasite Trichomonas vaginalis and is accordingly useful as an antifungal and antiparasitic agent.

The following descriptive examples will illustrate this invention.

EXAMPLE 1

10,11-dihydro-10,11-epoxy-5H-dibenzo[a,d]cycloheptene-5-carbonitrile

To a solution of 5H-dibenzo[a,d]cycloheptene-5-carbonitrile (50.0 g., 0.23 mole) in ethyl acetate (300 ml.) is added a solution of 85 percent m-chloroperbenzoic acid (57.6 g., 0.28 mole) in ethyl acetate (260 ml.). The solution is kept at room temperature for nine days. Ultraviolet spectra showed the triene absorption at 268 m$\mu$. to drop from an optical density of 1.80 to a density of 0.47 during this period.

Addition of hexane to the reaction mixture, cooling, and filtration, followed by concentration of the filtrate and addition of chloroform causes a precipitate of m-chlorobenzoic acid to separate. The chloroform filtrate is washed with sodium bisulfite, sodium bicarbonate and water, dried and concentrated under reduced pressure to give a residue which is crystallized together with the first precipitate to yield the title compound with M.P. 162–163° C. after crystallization from chloroform-hexane, also identified by elemental anlysis and IR, UV and NMR spectography.

EXAMPLE 2

10,11-dihydro-10-hydroxy-5H-dibenzo[a,d]cycloheptene-5-carbonitrile

A solution of 10,11 - dihydro - 10,11 - epoxy - 5H-dibenzo[a,d]cycloheptene - 5 - carbonitrile obtained as described in Example 1 (25.6 g., 0.11 mole) in absolute ethanol (250 ml.) is hydrogenated at atmospheric pressure, at room temperature, over 10 percent palladium/charcoal (2 g.) for one hour 20 minutes. The solution is filtered through Celite, water is added to the filtrate, and the crystals separated to give the title compound with M.P. 151–152° C. after crystallization from chloroform-hexane, identified by elemental analysis and IR, UV and NMR and infrared spectography.

EXAMPLE 3

10-oxo-5H-dibenzo[a,d]cycloheptene-5(11H)-carbonitrile

To a solution of 10,11-dihydro-10-hydroxy-5H-dibenzo[a,d]cycloheptene-5-carbonitrile obtained as described in Example 2 (65.2 g., 0.278 mole) in acetone (1300 ml.), cooled to 0° C. (inside temperature) is added slowly, with stirring, Jones' reagent (8 N chromic acid; 82.5 ml.; 0.33 mole). The reaction mixture is stirred, with cooling for one-half hour and then filtered through Celite. The filtrate is concentrated under reduced pressure to half-volume, diluted with water and filtered. The residue is immediately dissolved in chloroform, washed several times with water, dried, and concentrated to a residue. Crystallization from chloroform; hexane yields the title compound with M.P. 128–129° C., identified by elemental analysis and spectography.

EXAMPLE 4

10-methoxy-5H-dibenzo[a,d]cycloheptene-5-carbonitrile

To a solution of analytically pure methanol (125 ml.) through which hydrochloric acid gas has been passed for five minutes, is added 10-oxo-5H)dibenzo[a,d]cycloheptene-5(11H)-carbonitrile (8.4 g., 0.036 mole), obtained as described in Example 3. The solution is left at room temperature for one hour, the mixture is cooled and filtered to give the title compound with M.P. 145.5–146.5° C. after recrystallization from methanol, identified by elemental analysis.

Similarly, but mixing, with cooling, 0.5 g. 10-oxo-5H-dibenzo[a,d]cyclohepten-5-carbonitrile and 1.0 ml. thionyl chloride in 0.8 ml. dry ethanol followed by 3 ml. dry ethanol, and allowing the mixture to stand at room temperature for 3 days, 10-ethoxy-5H-dibenzo[a,d]cycloheptene-5-carbonitrile is obtained with M.P. 157–158° C. after crystallization from ethanol.

In a similar manner, 10-oxo-5H-dibenzo[a,d]cycloheptene-5-carbonitrile (0.5 g., 0.002 ml.), is added to an anhydrous solution of dry benzene (100 ml.), ethylene glycol (0.6 g.) and p-toluenesulfonic acid (100 mgm.). The solution is heated under reflux for 20 hours. Water is removed from the reaction mixture as it is formed. The benzene fraction is washed with sodium bicarbonate, water, dried and concentrated to an oily residue. Trituration with a mixture of chloroform:hexane yields 10-(2-hydroxyethyleneoxy) - 5H - dibenzo[a,d]cycloheptene-5-carbonitrile with M.P. 152–153° C. after crystallization from dry ethanol, identified by elemental analysis and by $\nu_{max}^{Nujol}$ 3260, 2240, 1563 cm.$^{-1}$

EXAMPLE 5

10-methoxy-5H-dibenzo[a,d]cycloheptene-5-carboxamide

To a cooled solution of 10-methoxy-5H-dibenzo[a,d]cycloheptene-5-carbonitrile (18.7 g., 0.075 mole), obtained as described in Example 4, in acetone (800 ml.) is added 30 percent hydrogen peroxide (300 ml.). A mixture results to which is added with stirring a 10 percent potassium carbonate solution (360 ml.). The mixture is slowly heated to the reflux temperature (40 mins.). At reflux temperature the reaction mixture is a solution and becomes exothermic. The heat is removed and the solution is left stirring at room temperature for 18 hours. The acetone is removed under reduced pressure to yield the title compound with M.P. 224–225° C. after recrystallization from dioxane:ether. It is identified by elemental analysis and spectography.

EXAMPLE 6

10-methoxy-5H-dibenzo[a,d]cycloheptene-5-methylamine

A solution of 10-methoxy-5H-dizenbo[a,d]cycloheptene-5-carbonitrile (23.0 g., 0.093 mole), obtained as described in Example 4, in absolute methanol saturated with ammonia, (275 ml.) is hydrogenated at a pressure of 1100 p.s.i. at 75° C. over Raney nickel (2.3 g.) for seven hours.

The solution is filtered through Celite and the filtrate concentrated to yield the title compound as an oil $\nu_{max}^{Nujol}$ 1565, 3390 cm.$^{-1}$ The above oil is dissolved in ether and treated with ethereal hydrochloric acid to give 23.0 g. of the hydrochloride salt, with M.P. 244–245° C. after recrystallization from a mixture of isopropanol, acetonitrile and ether, and further identified by elemental analysis.

The above amine is further characterized as its N-acetyl derivative, as follows.

To a solution of the amine obtained as described above (8.0 g., 0.032 mole) in dry benzene (100 ml.) and triethylamine (4.0 g., 0.04 mole) is added with cooling and stirring a solution of acetyl chloride (3.1 g., 0.038 mole) in dry benzene (25 ml.). The reaction mixture is stirred with cooling for one hour and then at room temperature for one hour. Water is added to the reaction mixture. The benzene layer is separated, washed with water, dried and concentrated to a small volume, diluted with hexane and cooled to yield 10-methoxy-5H-dibenzo[a,d]cycloheptene-5-methylacetylamine with M.P. 145–146° C., identified by elemental analysis.

EXAMPLE 7

10,11-dihydro-10,5-(iminomethano)-5H-dibenzo[a,d]cyclohepten-10-ol

Concentrated hydrochloric acid (6 ml.) is added to a solution of 10-methoxy-5H-dibenzo[a,d]cycloheptene-5-methyl-amine hydrochloride (5.0 g., 0.018 mole), obtained as described in Example 6, in water (300 ml.). The solution is left at room temperature for 24 hours. The reaction mixture is treated with sodium bicarbonate with cooling, to yield the title compound with M.P. 192–193° C. after crystallization from ethanol, identified by elemental analysis and spectography.

We claim:
1. A compound selected from the group which consists of 10,11 - dihydro-10,5-(iminomethano)-5H-dibenzo[a,d]cyclohepten-10-ol and acid addition salts thereof with pharmacologically acceptable organic and inorganic acids.
2. 10,11-dihydro - 10,5 - (iminomethano)-5H-dibenzo[a,d]cyclohepten-10-ol.
3. The process of preparing 10,11-dihydro-10,5-(iminomethano)-5H-dibenzo[a,d]cyclohepten-10-ol which comprises treating 5H - dibenzo-[a,d]cycloheptene-5-carbonitrile with 3-chloroperbenzoic acid, and isolating 10,11-dihydro-10,11-epoxy-5H-dibenzo[a,d]cycloheptene - 5 - carbonitrile; subjecting said last-named compound to catalytic hydrogenation in the presence of palladium-on-charcoal, and isolating 10,11-dihydro-10-hydroxy-5H-dibenzo[a,d]cycloheptene-5-carbonitrile; subjecting said last-named compound to oxidation with chromic acid in acetone, and isolating 10 - oxo-5H-dibenzo[a,d]cycloheptene-5(11H)-carbonitrile; treating said last-named compound with an agent selected from the group consisting of methanol, ethanol, and ethylene glycol in the presence of hydrogen chloride, and isolating the corresponding enol ether; treating said enol ether with an agent selected from the group consisting of Raney nickel in methanol saturated with ammonia, and diborane, and isolating the corresponding aminomethyl derivative; treating said aminomethyl derivative with an excess amount of aqueous hydrochloric acid under ambient conditions followed by neutralization; and isolating 10,11-dihydro-10,5-(iminomethano)-5H-dibenzo[a,d]cyclohepten-10-ol.

References Cited

UNITED STATES PATENTS

| | | | |
|---|---|---|---|
| 3,466,288 | 9/1969 | Hansen et al. | 260—289 |
| 3,479,358 | 11/1969 | Hansen et al. | 260—289 X |
| 3,487,075 | 12/1969 | Davis et al. | 260—239.3 |
| 3,509,158 | 4/1970 | Dobson et al. | 260—289 X |

DONALD G. DAUS, Primary Examiner

U.S. Cl. X.R.

260—286 R, 348 C, 465 R, 465 F, 559 R, 570 R, 570.5 R; 424—258

PO-1050
(5/69)

UNITED STATES PATENT OFFICE
CERTIFICATE OF CORRECTION

Patent No. 3,641,038      Dated February 8, 1972

Inventor(s) Martin A. Davis and Thomas A. Dobson

It is certified that error appears in the above-identified patent and that said Letters Patent are hereby corrected as shown below:

Column 1, line 3, "[a,d]Cyclohepten-10-01;" should read --[a,d]Cyclohepten-10-ol;--

Column 3, line 40, "characterized as their acrylated deriv-" should read --characterized as their acylated deriv- --

Column 3, line 74, "The novel crbinolamine" should read --The novel carbinolamine--

Column 5, line 42, "10-oxo-5H)dibenzo[a,d]" should read --10-oxo-5H-dibenzo[a,d]--

Column 6, line 17, "10-methoxy-5H-dizenbo[a,d]" should read --10-methoxy-5H-dibenzo[a,d]--

Signed and sealed this 27th day of March 1973.

(SEAL)
Attest:

EDWARD M. FLETCHER, JR.
Attesting Officer

ROBERT GOTTSCHALK
Commissioner of Patents